United States Patent

Siorek et al.

[11] 4,337,849
[45] Jul. 6, 1982

[54] ENERGY MANAGEMENT DAMPER

[75] Inventors: Richard W. Siorek; James P. Theuerkauf, both of Macomb, Mich.

[73] Assignee: The United States of America as represented by the Secretary of the Army, Washington, D.C.

[21] Appl. No.: 171,872

[22] Filed: Jul. 24, 1980

[51] Int. Cl.³ ............................................... F16F 9/52
[52] U.S. Cl. ................................... 188/276; 188/277; 188/287; 184/6.22; 236/66
[58] Field of Search ............. 188/282, 276, 277, 320, 188/266, 318, 317, 286, 287, 322, 322.11–322.15; 236/93 R, 66; 184/68, 6.22

[56] References Cited

U.S. PATENT DOCUMENTS

| | | | |
|---|---|---|---|
| 2,024,536 | 12/1935 | Pearce | 184/68 |
| 2,035,954 | 3/1936 | Focht | 188/282 |
| 3,088,555 | 5/1963 | Karlgaard | 188/276 |
| 3,089,648 | 5/1963 | Read | 236/93 R |
| 3,301,410 | 1/1967 | Seay | 188/276 |

*Primary Examiner*—Trygve M. Blix
*Assistant Examiner*—Thomas J. Brahan
*Attorney, Agent, or Firm*—Peter A. Taucher; John E. Becker; Nathan Edelberg

[57] ABSTRACT

A conventional shock absorber is modified by adding a valve cage to the rod end and providing an additional cylinder outside the shock absorber to form an annular reservoir outside the shock absorber. Temperature sensitive valves open when oil heats to a potentially destructive level, unloading the shock absorber. When the oil cools to a safe operating temperature, the temperature sensitive valves re-close and the shock absorber is again operative.

3 Claims, 9 Drawing Figures

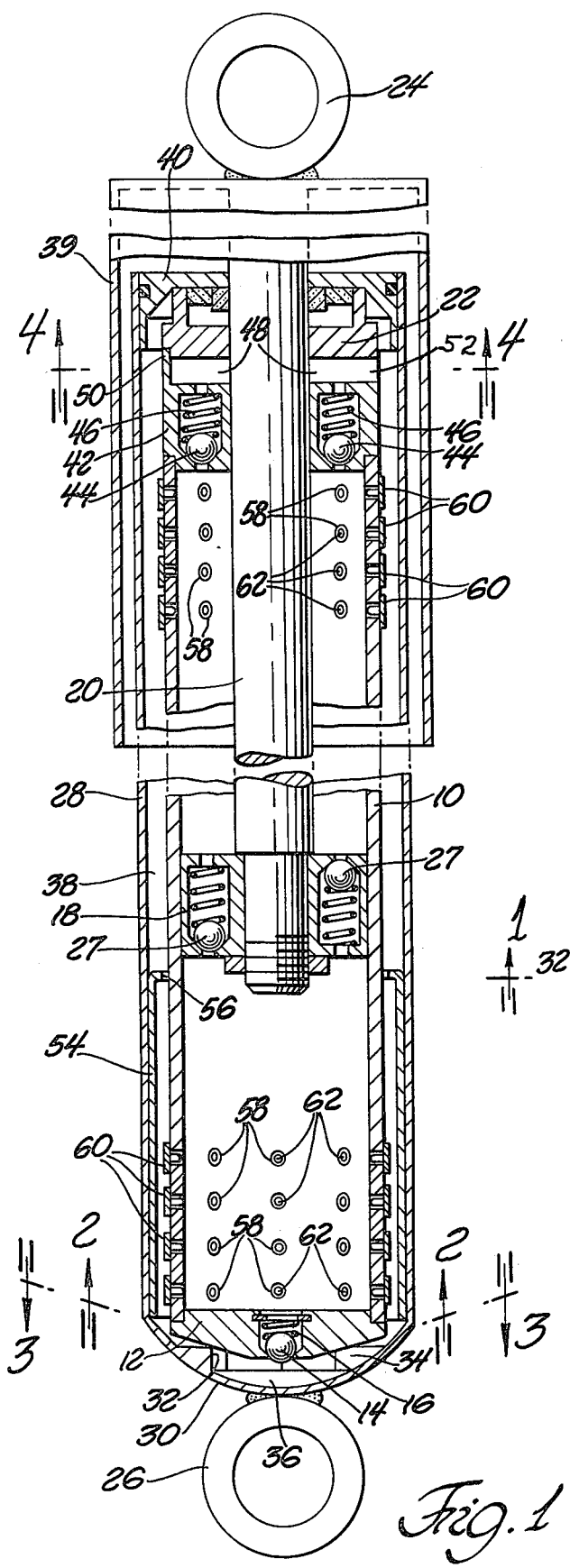
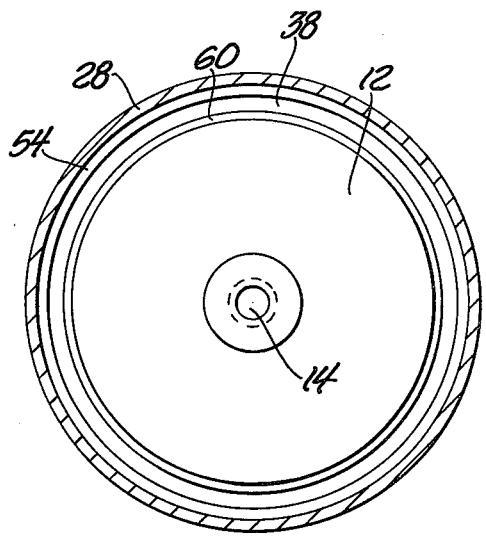
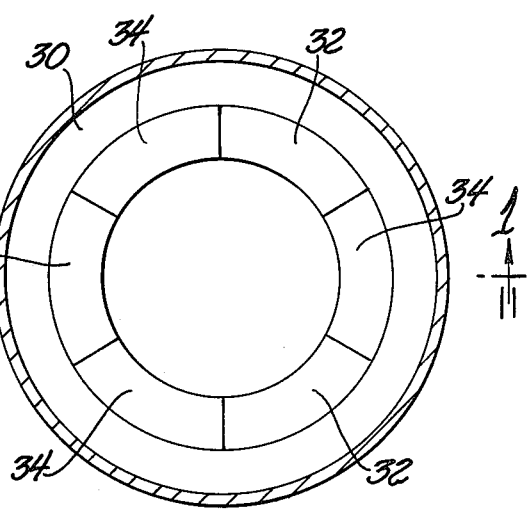

ENERGY MANAGEMENT DAMPER

GOVERNMENT INTEREST

The invention described herein may be manufactured, used, and licensed by or for the Government for governmental purposes without payment to us of any royalty thereon.

BACKGROUND

Automotive vehicle suspension dampers, better known as "shock absorbers", and dampers in other suspension systems are basic hydraulic devices which convert mechanical motion energy into thermal energy. In so doing, they control suspended mass oscillations to preclude build-up to untenable levels. Many applications of these devices, particularly automotive, provide extremely restrictive package sizes and locations for the amounts of energy to be handled. As a result, the units tend to overheat. This causes premature seal failures, fluid degradation, structural softening and general system deterioration.

Until recently, operation of military equipment in the same "throw-away" mode as the commercial automotive market was acceptable. Dampers were not excessively expensive, were usually not mission-critical and were generally easy and cheap to replace. With the advent of high performance, cross-country vehicles, this situation has changed. The dampers in these systems are critical to overall vehicle performance. Coupled with their increasing criticallity is their increased cost. "Throw-away" is rapidly becoming unacceptable. System failure is not allowable as it could put in jeopardy the vehicle, its crew and the mission. Thus, a means of preventing overheat failures is now necessary.

Several factors dictate the chosen approach. The system must be self-actuating, preferably self-contained and inherently simple. Once the overload condition has passed, the unit should reset itself without outside aid. Also addressed are ways to keep the system from thermally overloading in the first place. These involve methods for increaasing cooling area, improving heat transfer and distributing heat load.

SUMMARY OF THE INVENTION

Whereas a conventional "shock absorber" utilizes a valve cage at the head end of the cylinder and shears fluid through the cage in both directions, in the invention here disclosed and claimed, fluid flow is unidirectional to avoid build-up of "hot spots" or regions, and one feature which contributes to such unidirectional flow is a second valve cage at the rod end. Another feature is a fluid reservoir in the form of an annular space surrounding the damper cylinder and unidirectional flow through the annular reservoir. In a preferred form, both ends of the damping cylinder are provided with temperature responsive valves which open when fluid temperature reaches a predetermined maximum and thus unload the shear valves.

It is thus an object of the invention to provide a more sophisticated shock absorber which becomes an energy management damper by moving sheared oil unidirectionally through the damping cylinder and a structurally juxtaposed reservoir, and having temperature sensitive valves to open when oil temperature reaches a predetermined maximum to permit non-shearing movement of the damping piston through the oil.

IN THE DRAWINGS

FIG. 1 is a longitudinal sectional view through an energy management damper made in accordance with the invention herein disclosed and claimed, being a view in section substantially on lines 1—1 of FIG. 3 and of FIG. 4.

FIG. 2 is a view in section substantially on line 2—2 of FIG. 1.

FIG. 3 is a view in section substantially on line 3—3 of FIG. 1.

THE EMBODIMENT OF FIGS. 1-6

Figure 4:
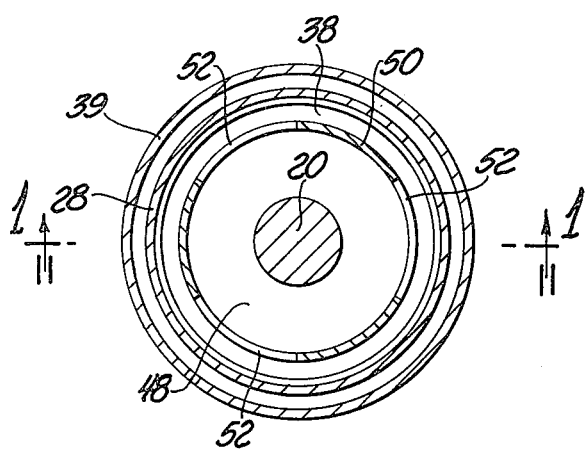
FIG. 4 is a view in section on line 4—4 of FIG. 1.

A cylinder 10 is provided with a head 12 which is check valved at 14 to permit flow of oil into the cylinder against the bias of a spring 16. A piston 18 is reciprocable in cylinder 10 and is secured to a piston rod 20 which passes through a suitably packed end closure 22. At its upper end, rod 20 carries a mounting element 24 adapted to be secured to the vehicle frame or body structure; the cylinder head—i.e., the lower end of the energy management damper—carries a mounting element 26 adapted to be secured to the wheel suspension structure. Fluid flow through piston 18 in both directions is provided by oppositely directed check valves 27.

A casing or second cylinder 28 surrounds cylinder 10, having a head 30 spaced from head 12 by supports 32 circumferentially spaced by and alternating with flow passages 34. Cylinder head 30 is axially spaced from cylinder head 12 to provide a head chamber 36 between the two cylinder heads. Cylinder 28 is radially larger than cylinder 10 to provide an annular space 38 which serves as a reservoir for the damping oil. Passages 34 permit free flow of oil from reservoir 38 into head chamber 36.

An open-ended sleeve 39 is secured to the upper end of rod 20 and serves to protect what would otherwise be an exposed section of the rod with the damper in the extended condition.

The upper end of the assembly seen in FIG. 1 shows an end closure 40 for casing or cylinder 28. Closure 40 is centrally apertured and suitably packed to permit passage of piston rod 20, and cooperates with closure 22 and a valve cage 42 to clamp cylinders 10 and 28 against movement of one relative to another. Valve cage 42 is clamped between closure 22 and the upper end of cylinder 10, and houses check valve means 44 which permit oil to leave the upper end of cylinder 10 against a predetermined back pressure provided by suitable springs 46.

Oil leaving by way of check valve means 44 empties upward into annular space 48, which is provided by a longitudinally extending circumferential flange 50. Flange 50 is cut away to provide passages 52 which permit the oil in space 48 to flow radially outward into annular reservoir 38 and then downward for re-entry into cylinder 10 by way of check valve 14. A cylindrical liner 54 is flanged at 56 to provide a baffle in the downward path of oil in reservoir 38, to inhibit surging of the oil and thus to minimize foaming of the oil.

Temperature responsive valves are provided to unload the shock absorber when the terrain is so rough and vehicle speed is so high that the oil temperature, in a conventional shock absorber, would increase to the point that destruction of the shock absorber would occur. One embodiment of such valves is shown in FIGS. 1–6 and comprises radial passages 58 at each end of cylinder 10. Temperature responsive endless bands 60 surround the outer surface of cylinder 10, and are provided with radially-inward extending guides 62 (FIGS. 5 and 6) engaging the oil passages to keep the bands in position to cover the passages 58.

THE EMBODIMENT OF FIGS. 7 AND 8

Figure 7:
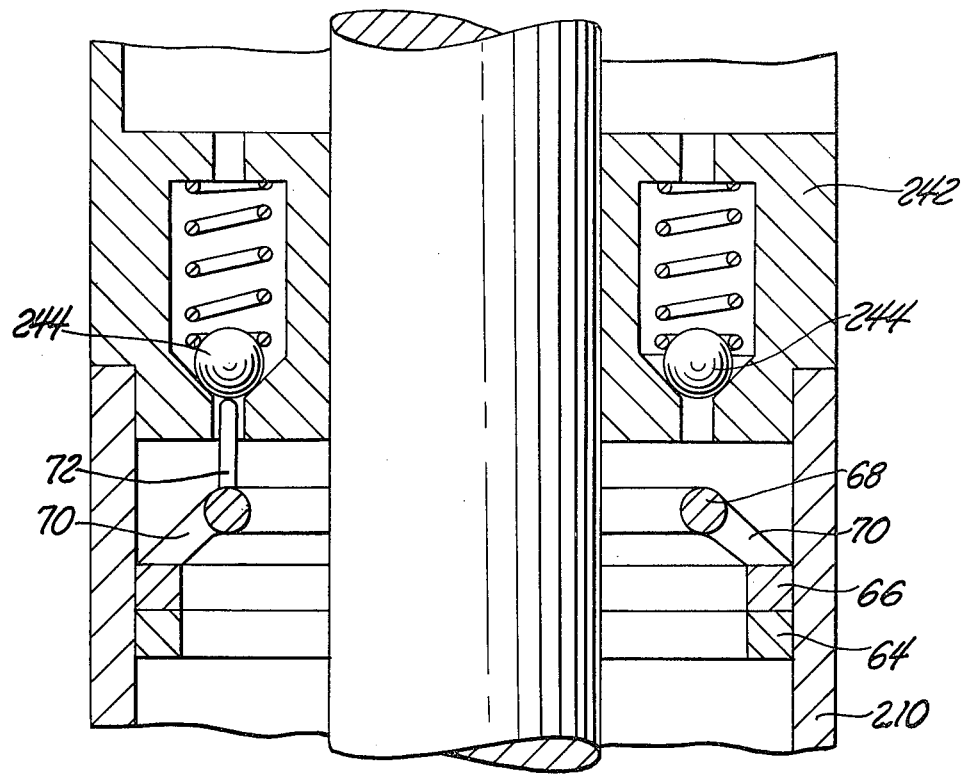
FIG. 7 is a longitudinal sectional view through a rod end valve cage and an alternative form of temperature responsive valve.
Figure 8:
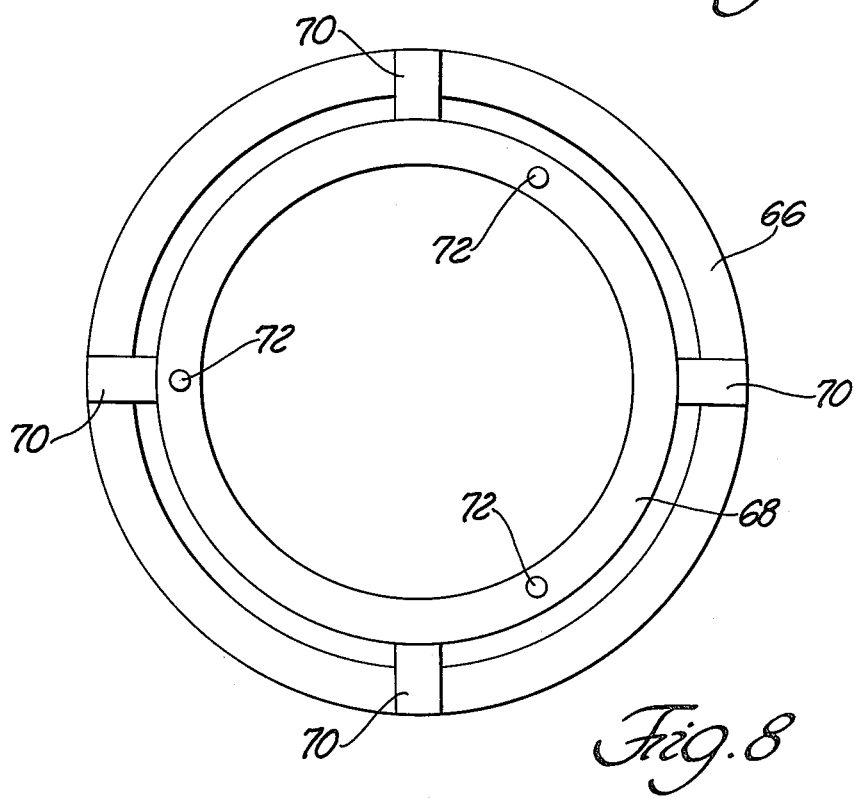
FIG. 8 is a top plan view of the temperature responsive valve actuating device shown in FIG. 7.

Another means of unloading the shock absorber is shown in FIGS. 7 and 8. FIG. 7 is a longitudinal section through the upper valve cage portion of an energy management damper, wherein unloading is accomplished by means to hold at least some of the check valves open constantly during overheat conditions.

Specifically, a ring 64 is suitably secured in cylinder 210 below valve cage 242 which is provided with check valves 244 in substantially the same configuration as FIG. 1. A second ring 66 is located on ring 64 and may be press fitted in cylinder 210.

A third ring 68 is spaced from and supported on ring 66 by a plurality of legs 70 of a material which has a higher coefficient of expansion than that of cylinder 210. The upper surface of ring 68 carries a plurality of fingers 72 which extend upward and are axially aligned with the balls of check valves 244. The number of fingers 72 is equal to the number of ball check valves which the designer calculates need to be opened to effectuate the unloading required to permit cooling of the damping oil. The length of the fingers is less than enough to contact the balls when the damper assembly is cold and to allow for normal damping at temperatures less than overheated values.

THE FIG. 9 EMBODIMENT

Figure 9:
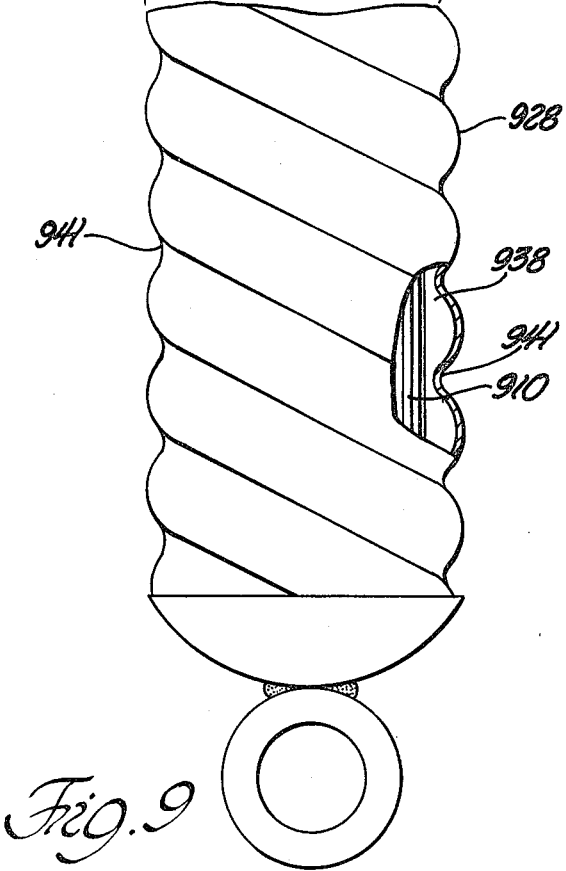
FIG. 9 is a view primarily in elevation with a portion broken away to show details, of another embodiment of the invention.

The energy management damper shown in FIG. 9 differs in that the outer cylindrical shell 28 of FIG. 1 is formed as a helical shell 928. The open-ended sleeve 939 in FIG. 9 is substantially identical to the corresponding open-ended sleeve 39 shown in FIG. 1. Cylinder 910 in the FIG. 9 embodiment is the same as cylinder 10 of FIG. 2.

In the FIG. 9 embodiment, the narrow portions of shell 928, such as at 941, constrict the flow passage between shell 928 and cylinder 910, obviating the need for the liner 54 and its flange 56 of the FIG. 1 embodiment.

OPERATION

Figure 5:
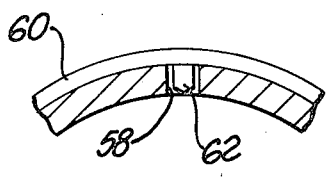
FIGS. 5 and 6 are enlarged detail views showing a portion of a temperature responsive valve in the closed and open positions respectively.
Figure 6:
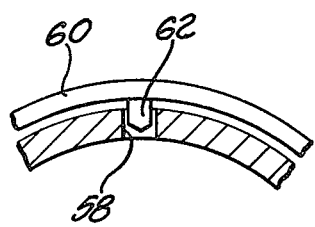

The science of bimetallic elements is very well developed by this time, and there are certainly a great many engineers who are fully competent to design temperature responsive devices such as: the valves 60 in FIGS. 1, 5 and 6; and the valve actuating assembly 66–72 in FIGS. 7 and 8. It will suffice here to indicate that either naval brass or phosphor bronze is a material which readily lends itself to applications such as those here proposed. Other temperature sensitive valving devices (such as the wax pellet type) lend themselves to applications such as those here proposed.

FIGS. 1 THROUGH 6

As will be understood by those skilled in the art, valves 60 are designed to be closed at oil temperatures low enough to enable operation of the damper without damage to seals and such other structural features as may be damaged by excessive oil temperatures including of course the oil itself. For such normal operation, oil flows upward within cylinder 10 and downward through annular space 38. Cylinder 28 presents a substantial external surface to the ambient air, so that overheating of the energy management damper is delayed and the operating time span is lengthened.

Nevertheless, the temptation to operate the vehicle at excessive speeds, especially in combat, will eventually result in oil temperatures so high that total failure of the energy management damper is threatened. When the oil gets too hot, valves 60 will open as shown in FIG. 6, whereupon oil will flow quite freely between the space inside cylinder 10 and annular space 38.

The resulting rough ride will be sufficiently uncomfortable to force the operator to drive more slowly, but even if vehicle speed is not reduced, the oil now has a chance to cool, and when it cools below the critical temperature, valves 60 shrink sufficiently to close passages 58, and the shock absorber once again becomes operational.

FIGS. 7 AND 8

The embodiment of FIGS. 7 and 8 operates substantially the same as that of FIG. 1 so long as oil temperature is below the critical value. As oil temperature rises, the increase is transmitted to fingers 72 which elongate faster than the metal of cylinder 210, and eventually each finger 72 lifts its associated ball off its seat, unloading the shock absorber. The valves thus held open allow oil to flow relatively freely without significant damping effect and without significant shearing of the oil; the oil cools, fingers 72 shorten, and the check valves begin again to function as check valves.

The FIG. 9 embodiment may have internal structure similar to either the FIGS. 1 through 6 embodiment or the FIGS. 7 and 8 embodiment. The difference is that the FIG. 9 embodiment will have more uniform cooling because of the helical configuration which will cause the flow in reservoir 938 to be helical rather than random.

We wish it to be understood that we do not desire to be limited to the exact details of construction shown and described for obvious modifications will occur to a person skilled in the art.

What is claimed is:

1. An expansible chamber energy management damper comprising a first cylinder having a head end and a rod end, a piston and piston rod reciprocable in the cylinder, a second cylinder having a head end and a rod end and surrounding the first and having its inside cylinder walls spaced from the outside cylinder walls of the first cylinder, the annular space between the two cylinder walls constituting a fluid reservoir, the two cylinders spaced apart axially at their head ends to provide a head chamber between them, fluid flow passages connecting said head chamber and said annular reservoir, at least two fluid flow passages in the piston for fluid flow through the piston, a check valve in one of said at least two passages to permit fluid to flow from the rod side of the piston, a check valve in the remaining one of said at least two fluid flow passages to permit fluid to flow toward the rod side of the piston, packing means in the rod end of the first cylinder to provide a fluid seal between the first cylinder and the rod which allows normal reciprocation of the piston and piston rod without fluid leakage past the rod to atmosphere, check valve means for permitting fluid flow from the rod side of the piston to the fluid reservoir, check valve means for permitting fluid flow from the head chamber into the first cylinder, means to conduct fluid between the space inside the first cylinder and the reservoir, and temperature responsive valve means normally closing the last-named fluid conducting means and openable when the fluid heats to a predetermined high temperature, whereby heating of the fluid to a potentially destructive temperature unloads the damper.

2. The expansible chamber energy management damper of claim 1, wherein
   said first cylinder is provided with at least one set of a plurality of circumferentially spaced fluid conducting openings coplanarly arranged;
   each set of said fluid conducting openings being regulated by normally closed temperature responsive value means comprised of an annular band disposed about each set of circumferentially spaced fluid conducting openings, said band being temperature responsive so as to open by heat expansion when the fluid in the first cylinder element reaches a predetermined potentially destructive temperature, and thereby unloads the damper by conducting the fluid to the aforementioned reservoir for cooling to a predetermined safe temperature.

3. The expansible chamber energy management damper of claim 1, being of a vehicle suspension shock absorber type and which utilizes a liquid oil as the fluid in said fluid reservoir,
   wherein said means to conduct said fluid liquid between the space inside the first cylinder and said reservoir comprises at least one set of a plurality of circumferentially spaced openings coplanarly arranged through said first cylinder's wall; and
   wherein said temperature responsive valve means normally closing the last named fluid liquid conducting openings comprises a temperature-responsive expansible-contractible annular band surrounding each set of openings.

* * * * *